United States Patent [19]

Cummings

[11] Patent Number: 4,812,493

[45] Date of Patent: Mar. 14, 1989

[54] DUAL CURE RATE WATER-BASED COATING COMPOSITIONS

[75] Inventor: Lowell O. Cummings, San Anselmo, Calif.

[73] Assignee: Adhesive Coatings Co., San Mateo, Calif.

[21] Appl. No.: 36,988

[22] Filed: Apr. 10, 1987

[51] Int. Cl.[4] ............... C08L 61/32; C08L 61/30; C08L 63/00

[52] U.S. Cl. ................... 523/412; 523/172; 523/413; 523/416; 523/223; 523/450; 524/60; 524/270; 524/276; 524/475; 524/512; 524/542

[58] Field of Search ............... 523/172, 414, 416, 412, 523/413, 450; 524/512, 542, 60, 270, 276, 475; 525/110

[56] References Cited

U.S. PATENT DOCUMENTS

| | | | |
|---|---|---|---|
| 4,461,351 | 7/1984 | Falk | 524/512 |
| 4,487,889 | 12/1984 | Craun | 524/512 |
| 4,490,510 | 12/1984 | Cummings | 525/490 |
| 4,525,535 | 6/1985 | Craun | 524/512 |
| 4,542,180 | 9/1985 | Carlson | 524/512 |
| 4,574,145 | 3/1986 | Cummings | 525/509 |
| 4,608,410 | 8/1986 | Borovicka | 524/512 |
| 4,683,260 | 7/1987 | Wickert | 524/512 |

FOREIGN PATENT DOCUMENTS

| | | | |
|---|---|---|---|
| 52-36197 | 3/1977 | Japan | 523/172 |
| 52-36198 | 3/1977 | Japan | 523/172 |

Primary Examiner—C. Warren Ivy
Attorney, Agent, or Firm—Hosier & Sufrin, Ltd.

[57] ABSTRACT

A two component water-based composition which cures in two stages, an initial rapid curing stage and a slower curing stage, comprising as the first component, a mixture of a polyaldehyde chosen from the group consisting of glyoxal glutaraldehyde and derivatives of glyoxal and gluteraldehyde, and a water dispersible component chosen from the group consisting of poxy resin emulsions which can be emulsified in water, synthetic latexes stable at about pH 7 or less, low molecular weight resin emulsions, epoxy ester emulsions, water emulsified alkyds, and cationic, anionic and non-ionic asphalt emulsions and, as the second component, the non-gel reaction product of N,N'-bis(methoxymethyl) uron and a polyamine chosen from a group consisting of primary and secondary amines and/or a monoamine.

29 Claims, No Drawings

DUAL CURE RATE WATER-BASED COATING COMPOSITIONS

BACKGROUND OF THE INVENTION

This invention relates generally to water-based coating compositions and, more particularly, to water-based coating compositions which cure in at least two stages, an initial rapid cure stage in which a protective film is formed, and a slower curing stage in which a final hard coating with outstanding wear characteristics is produced. In addition, the coating compositions can be applied and will cure rapidly under a wide range of environmental conditions, are free of environmentally objectionable organic solvents such as glycols, glycol ethers, paint thinners, etc., and are outstandingly long-wearing and adherent.

In one important embodiment, this invention relates to water-based coatings which can be applied to asphalt and concrete road surfaces and other types of pavements under weather conditions ranging from sunshine to rain to cool temperatures, yet can be driven on almost immediately after application under all of these application conditions.

In another important embodiment, this invention relates to solvent-free rapidly curing coating compositions suitable for application to steel and other surfaces commonly coated with conventional epoxy systems. In yet another important embodiment, the invention relates to coatings which can be applied at substantial thicknesses without significant sagging even on vertical and underside surfaces. In a still further embodiment, this invention relates to new water-based asphalt emulsion coating compositions which can be applied to roads, tarmacs, driveways and other surfaces by spraying, which dry almost instantaneously and which resist gasoline and most organic solvents.

Although the present invention will find application in numerous areas from traffic paints, to coatings for steel and other materials, to asphalt emulsions, for convenience, the primary focus of the description below will be on traffic paint applications. The invention, however, is not intended to be so limited but rather is to be construed as having application in any environment to which it is suited.

Traffic paints are the most common asphalt and concrete road coatings. For decades, traffic paints have been formulations of alkyd combined with various resins. Such formulations usually contain environmentally objectionable organic solvents. They cure or dry slowly, and therefore present logistical problems in preventing road traffic from destroying or degrading the markings before the paint is dry. Finally, alkyd/resin coatings lose thickness due to loss of solvent on drying and are not as durable as might be desired, particularly in demanding traffic applications.

In recent years, more durable coatings have been developed for traffic applications. These include epoxy and polyester paints, preformed tapes and thermoplastics.

Epoxy paints have the greatest potential as traffic paints in terms of durability and cost-effectiveness. Yet, in application, epoxy paints have heretofore presented serious drawbacks. Conventional epoxy paints use a two component epoxy mixed with a solvent which keeps the mixture fluid until it is ready to be applied. The presence of the solvent is environmentally highly undesirable, since it is ultimately released into the atmosphere. In addition, conventional epoxy coatings lose thickness on drying and tend to yellow with the passage of time.

Recently introduced epoxy paints having 100% solids eliminate the solvent release problem, but have other significant drawbacks. For example, 100% solids systems require heating before application, which makes them more difficult and expensive to use. In addition, since these systems typically require two parts of a highly viscous epoxy resin to one part curing agent, the mixture is mechanically difficult to use. These 100% solvent-free epoxy paints require about 15 minutes to cure to a degree sufficient to permit drive-over in traffic paint applications. Thus, the logistical problems of traffic re-routing are still present for both the conventional solvent-based and the solvent-free epoxy coatings since both require time to dry before traffic can pass over them.

SUMMARY OF THE INVENTION

The principal composition of the present invention comprises a combination of two components, designated Part A and Part B, which, when mixed, form a coating that can be applied and will cure rapidly under weather conditions ranging from sunshine to rain to cool temperatures, that will not release environmentally objectionable organic solvents and that will leave a long-wearing and adherent coating.

When Parts A and B are mixed, the resulting composition cures in two stages, a fist rapid cure stage in which an initial protective film is formed which will withstand moderate wear and a slower curing stage which produces a final hard coating with outstanding wear characteristics. As explained below, the slower curing stage will proceed in one or more steps, depending upon the curing rates of the coating materials contributing to the final hard coating. It is a unique characteristic of this composition that, immediately after completion of the rapid cure stage, it produces a coating that is not wet to the touch, notwithstanding the fact that the slower curing stages are not yet complete.

The coating of the invention can be applied to asphalt and concrete road surfaces under weather conditions ranging from sunshine to rain to cool temperatures, yet can be driven on almost immediately after application under all of these application conditions. It can also be applied to steel and other surfaces commonly coated with conventional epoxy systems. It can be applied at substantial thicknesses without significant sagging even on vertical and underside surfaces. Finally, it can be formulated as a water-based asphalt emulsion coating composition which can be applied to roads, tarmacs, driveways and other surfaces by spraying, to dry almost instantaneously and resist gasoline and most organic solvents.

PART A

In an epoxy resin based embodiment of the invention, Part A comprises a mixture of a polyaldehyde and an epoxy resin emulsion.

Useful polyaldehydes include glyoxal, glutaraldehyde, and derivatives of either of those compounds which retain free aldehyde groups. Glyoxal is the preferred polyaldehyde.

A typical useful glyoxal derivative is the reaction product of urea and glyoxal as depicted in the following formula:

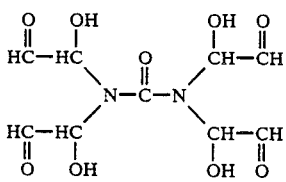

Another useful glyoxal derivative may be obtained by reacting a urea formaldehyde resin with glyoxal.

The epoxy resin of Part A of this embodiment of the invention is a conventional epoxy resin which can be emulsified in water. Typical such epoxy resins include condensation products of epichlorohydrin and bisphenol A. Preferred among these are epoxy resins having a weight per epoxy ("WPE") of about 190 or a molecular weight of about 380. Higher molecular weight epoxies, while more difficult to emulsify in water, are nevertheless also suitable for use in the practice of the present invention.

One liquid epoxy resin which has been found to be useful in the practice of this epoxy resin based embodiment of the present invention is Shell's EPON 828 (WPE 190). The structure of this representative conventional liquid epoxy resin is:

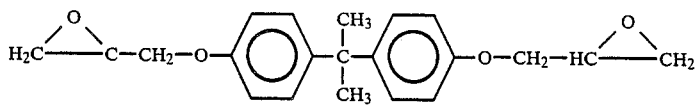

Although it is preferred that emulsifiable epoxy resins be used in Part A of this embodiment, in other useful embodiments some or all of the epoxy resins in Part A may be replaced by incorporating other water-dispersible coating materials in Part A and/or Part B of the composition. Such alternative water-dispersible coating materials include synthetic latexes, water emulsified alkyds, low molecular weight resin emulsions, epoxy ester emulsions and cationic and non-ionic asphalt emulsions. Since the epoxy resin emulsions and each of these alternative coating materials cure or dry at different rates, where more than one slower curing material is used, the slower curing stage will proceed in steps corresponding to the cure or dry time of each material.

Typical useful synthetic latexes include the numerous common paint latexes used in conventional latex paints, such as polyvinyl acetate latexes, vinyl acrylic latexes, acrylic latexes, styrene-acrylic latexes and styrene-butadiene latexes. When it is desired to incorporate the latex into Part A of the composition, the latex chosen should be stable at a pH of about 7 or less. When it is desired to incorporate the latex into Part B, the latex chosen should be stable at a pH of at least about pH 11. Latexes to be incorporated into Part B should include an emulsifier system which tolerates high pHs such as emulsifier systems designed to be used in high pH systems like portland cement.

Vinyl acrylic latexes which may be used in the present invention include copolymers containing about 10-15% by weight acrylic monomer and about 85-90% vinyl acetate monomer. These latexes typically have a pH of about 4 to 5 making them particularly compatible with the glyoxal of Part A, which is very stable at low pH levels. Such vinyl acrylic latexes include POLYCO 2160, 2161, and 2186 which are available from the Borden Chemical Division of Borden, Inc., Thermoplastics Division, of Leominster, Massachusetts. Among this group, POLYCO 2186 is preferred in traffic paint applications because of its low glass transition temperature (5° C.) and its flexibility.

Acrylic latexes which are useful in the practice of the present invention include UCAR 123 and UCAR 503 which are available from Union Carbide Emulsion Systems of Cary, North Carolina. UCAR 123 is a 60% solids material having a pH of 5.8; UCAR 503 is a 58% solids material weighing 9.2 pounds per gallon and having a pH of 6.0. A useful styrene-acrylic latex is available from Speciality Polymers of Woodburn, Oregon under the trademark M-405. This styrene-acrylic latex, which contains about 50% by weight solids dispersed in water, is stable at very high pHs, and is therefore well-suited for incorporation in Part B. A styrene-butadiene latex which is useful in the practice of the invention is Dow S/B latex, particularly Dow S/B Latex #1 and #5 (also known as RAP 213 and RAP 212) which are available from The Dow Chemical Company of Midland, Mich.

Useful low molecular weight resin emulsions may be made from any water-dispersible polymer or copolymer resin of molecular weight under about 5000. For example, low molecular weight polyethylene wax-like materials which are emulsifiable in water can be used. Allied Corporation of Morristown, New Jersey offers two such materials, A-C6, a homopolymer of polyethylene (approximate molecular weight 2000) and A-C 540, a polyethylene/acrylic acid copolymer (approximate molecular weight 3200). These Allied Chemical materials can be emulsified in water by conventional means. Other examples of low molecular weight resin emulsions include tall oil rosin ester aqueous dispersions having molecular weights under about 500 such as Aquatac 5560 and Aquatac 5090 which are available from Sylvachem of Panama City, Fla.

PART B

Part B of both the epoxy resin based embodiment and the other embodiments containing other water-dispersible coating materials as discussed above comprise an aqueous solution of a reaction product of certain polyamines and urea-formaldehyde ether monomers. These urea-formaldehyde ether monomers are represented by the following uron structure, in which R is a methyl, ethyl, propyl, or butyl radical:

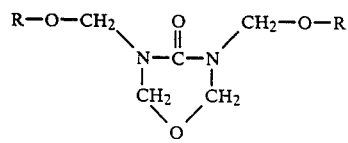

There may be small amounts of methylol groups in these urea-formaldehyde monomers. These methylol groups react with the polyamine in the same manner as the ethers react. Additionally, urea-formaldehyde ether monomers in which some polymerization has occurred may be used. The level of methylol groups should be short of that which would form a gel on reaction with the amine or, otherwise stated, the monomers should comprise a "non-gel product." N,N'-bis(methoxymethyl) uron is the preferred ether monomer in the practice of this invention. The structure and synthesis of the above reaction products of polyamines and urea-formaldehyde ether monomers are described in U.S. Pat. Nos. 4,490,510 and 4,574,145 to the present inventor.

Monoamines can be blended with the polyamines of Part B in any proportion up to 100% replacement of the polyamines. Monoethanolamine is the preferred monoamine. The mole ratio of polyamine to monoamine should range from about 1:0 to 1:3 and more preferably from about 1:0 to 1:1. The polyamines together with the monoamines when used will be present in a mole ratio to the N,N'-bis(methoxymethyl) uron or other urea-formaldehyde ether monomers of from about 2:3 to about 5:1 and more preferably from about 1:2 to about 4:1, with the caveat that the upper limit on the amines will be reduced for a particular amine when necessary to prevent gel formation with that amine or, otherwise stated, to produce a "non-gel reaction product."

The polyamines (and monoamines, when present) of Part B must be able to react with the polyaldehydes of Part A to rapidly form the initial protective film without producing unacceptably large or violent exotherms and without producing undesirable darkness in the film which would detract from the color of the final coating. Polyamines satisfying these criteria include any primary or secondary amine, with the primary amines being the more desired. Specific preferred polyamines of Part B include hexamethylene diamine, polyoxypropylene diamine, and mixtures of hexamethylene diamine and polyoxypropylene diamine. Specific preferred polyamine/monoamine blends include mixtures of hexamethylene diamine and monoethanol amine in mole ratios of about 1:4 to about 4:1.

In one particularly preferred embodiment of the invention, Part B is a difunctional curing agent prepared by reacting two moles of hexamethylene diamine, two moles of monoethanolamine and one mole (or four equivalents) of N,N'-bis(methoxymethyl) uron.

In another particularly preferred embodiment of the invention, Part B is a trifunctional curing agent prepared by reacting three moles of hexamethylene diamine, one mole of monoethanolamine and one mole (or four equivalents) of N,N'-bis(methoxymethyl) uron.

Part B may, less preferably, include hexamethylene diamine isomers such as 2-methylpentamethylene diamine and 1,2-diamine cyclohexane. In addition, some or all of the hexamethylene diamine or hexamethylene diamine isomers may be replaced by isophrone diamine, trimethyl hexamethylene diamine or xylene diamine.

In another preferred embodiment, where outstanding coating flexibility is desired, the combination of hexamethylene diamine with polyoxypropylene diamine may be employed. In this embodiment it is preferred that the polyoxypropylene diamine be of molecular weight preferably between about 230 and 400 and less preferably up to about 2000, in a ratio ranging from about 4 moles hexamethylene diamine to 1 mole of polyoxypropylene diamine (4:1) to about 1 mole of hexamethylene diamine to about 4 moles of the polyoxypropylene diamine (1:4). Preferred polyoxypropylene diamines include Jeffamine D-230 and D-400 available from Texaco Chemical Co. (See U.S. Pat. Nos. 3,236,895 and 3,654,370.) Useful alternatives to the polyoxypropylene diamines, also available from Texaco Chemical Co., include Jeffamine T-400 (polyoxypropylene triamine, molecular weight 400) and Jeffamine E.D. Diamine (polyoxyethylene diamine, molecular weight 600).

Part B is formed by first reacting the polyamine (and/or the monoamine) with the above-described urea-formaldehyde ether monomers and preferably with the N,N'-bis(methoxymethyl) uron to produce a non-gel urea-formaldehyde/amine reaction product, as described in U.S. Pat. Nos. 4,490,510 and 4,574,145.

When Part B is then combined with Part A, the excess polyamine and/or monoamine available after completion of the polyaldehyde/amine rapid cure reaction is available for a slowly curing reaction with the epoxy in the epoxy resin based embodiment of the invention. The level of polyamine and/or monoamine necessary of the epoxy reaction will depend upon the nature of both the epoxy and the polyamine used, and can be readily ascertained by one skilled in the art. Of course, in embodiments where a water-dispersible component other than epoxy resin is used, no excess polyamine or monoamine will be needed and the water-dispersible component simply cures at its own relatively slow rate without the use of an accelerator or curing agent.

Although the invention is not intended to be limited by any theories regarding how or why it works as it does, it is believed that the two stage curing obtained with the aldehyde-epoxy formulation of Part A is a result of independent reactions between Part B of the composition of the invention and each of the components of Part A, as follows:

First, a rapid reaction occurs between a portion of the polyamine (and/or monoamine) N,N'-bis(methoxymethyl) uron reaction product and the glyoxal of Part A to form, in seconds, a protective film. This film, which forms without regard to whether epoxy resin is present in Part A, is believed to contain substantial quantities of water in the form of occluded droplets which ultimately evaporate without significantly affecting the film thickness. This is in sharp contrast to conventional coatings which typically lose 30-50% of their wet thickness on drying due to loss of solvent.

In traffic paint applications, this initial film is strong enough to bear traffic and to resist paint pick-up in as little as 30 seconds after application. Meanwhile, the epoxy resin of Part A reacts with the remainder of Part B in a relatively slow cure reaction to produce after several hours time an epoxy coating with outstanding durability and adherence.

Pigments may be introduced in all embodiments into either or both of Parts A and B. Conventional pigments such as $TiO_2$, lead chromate, or conventional extender/pigments such as $SiO_2$ and $CaCO_3$ and conventionally available clays may be used. Pigment volume concentrations in the range of about 30 to 55% give outstanding adhesion.

Application of the present rapidly reacting system can be accomplished by spraying Parts A and B from separate spray guns so that the two sprays meet on the target surface. Mixing of the components preferably takes place both in the spray patterns and on the target surface. See U.S. Pat. No. 3,475,359, Example 10, for a description of the use of this application technique. Alternatively, Parts A and B can be combined in an internal mixing chamber of a rapidly acting sprayer such as a Binks Model 43PA and then immediately applied to the target area.

Where it is desired to incorporate glass beads into traffic paint coatings to enhance night visibility, referred to as "retroreflectivity" in the art, the beads (commonly about 5 to 10 mil in diameter) may be sprayed onto or otherwise introduced into the coating. In addition, larger beads (about 40 mils in diameter) may be used and are preferred for wet weather visibility since smaller beads are rendered almost useless by the water film present on the paint surface in wet weather.

In addition to protruding from the water film to overcome the visibility problem, the larger beads have the further benefit of bearing the brunt of traffic during the initial cure stage to protect the paint from dirt deposits or transfer to tire surfaces until the final, fully cured coating is obtained. Naturally, where night visibility is not a necessary or desirable objective, particulate matter other than glass beads may be introduced into the coating composition to protrude from the coating surface thereby preventing dirt transfer and paint pick-up and otherwise protecting the coating during the initial cure stage. Where glass beads are used, the level may range from about 3 to 15 pounds per gallon of coating and more preferably from about 8 to 12 pounds per gallon of coating. When 40 mil glass beads are used in the coating described in this invention, more than 75% of the surface area is covered with beads. This has been formed to be a particularly desirable level. In order to achieve good imbedding of these large glass beads, a coating of at least 20 mils is preferred.

The coatings of the present invention will be particularly useful in traffic paints and in other environments where it is useful or necessary to be able to apply them under cool or wet conditions, or where it is desirable that the coated surfaces be ready for use almost immediately after application. The coatings of the present invention will also be particularly useful where it is desirable to be able to obtain thick coatings which do not sag or require a multiplicity of applications to attain the desired coating thickness.

Each of the components of the coating composition of this invention are in aqueous solution. There are no requirements for coupling solvents such as glycols and glycol ethers such as are used in conventional water-based latex paints, so there need not be any organic solvents in the system. However, under certain circumstances it may be desirable to add small amounts of commercially available materials which include organic solvents to modify certain properties of the composition in accordance with common industrial practices. Finally, when asphalt emulsions are blended into Part A, and then Part B is mixed in as by spraying as described above, the resulting coating is highly resistant to gasoline, fuel oil and other organic solvents. This follows from the fact that the aldehyde/amine reaction products are extremely insoluble in practically any organic solvent.

The following examples are intended to illustrate the practice of the present invention. These examples are not intended to be exhaustive or limiting of the invention.

EXAMPLES

1. Preparation of an Emulsion of Liquid Epoxy Resin

In a 2 liter stainless steel container were placed 1000gm. of liquid epoxy resin of about WPE 190 or molecular weight about 380, such as EPO 828, made by Shell Chemical Co. Added to this was a mixture of 50gm. of water and 50gm. of a non-ionic emulsifier such as a condensation product of a nonylphenol and polyethylene oxide with a polyethylene chain length of about 40 to 50 units. Typical such useful non-ionic emulsifiers include GAF's IGEPAL CO977 and Quad Chemical's CARSONON N-50. Another useful non-ionic emulsifier which is specifically designed for making epoxy emulsions is Capcure 65, which is available from Diamond Shamrock Company. It is believed that this emulsifier is a stearic acid ester of polyethylene oxide with a chain length between 20 and 50 units.

This mixture was stirred with a propeller type stirrer until a uniform water-in-oil emulsion was formed. More water was slowly added with strong stirring until the emulsion changed from water-in-oil to oil-in-water, at around 75% epoxy resin level. Additional water was then added to bring the emulsion to the desired solids level of about 60-65% by weight.

2. Preparation of a Blend of Glyoxal and Epoxy Resin Emulsion (Part A)

Although glyoxal is normally supplied at a pH of about 2, if used at this pH, the glyoxal, when combined with the epoxy resin emulsion, could degrade the epoxy resin. Therefore, the glyoxal was neutralized to a pH of about 6 and then mixed with the epoxy emulsion produced in Example 1.

Neutralization of the glyoxal to a pH of about 6 is easily done by adding small amounts of preferably sodium bicarbonate or even calcium carbonate pigment, which can serve as well as an extender pigment. Once the glyoxal is at pH 6 it is blended with the epoxy emulsion by mixing with a slow-speed mixer in order to avoid excessive shear which would be detrimental to the emulsion, thereby forming a mixture which is found to be stable indefinitely.

3. Making a Pigment Dispersion in Neutralized Glyoxal Followed by Addition of Epoxy Resin Emulsion Since the ordinary commercial grade of glyoxal (40% glyoxal in 60% water) has unusually good pigment dispersing properties, it can be used as the pigment dispersing liquid without adding other pigment dispersing agents. In fact, there is very little pigment settling on standing and no hard pigment cake develops on the bottom of the container as experienced in many conventional systems.

Furthermore, when these glyoxal pigmentations are passed through a high-pressure airless spray pump, some pigment is forced out of suspension by the high pressure and the pigment may cake around the ball valves of the airless pump. This may be avoided by including in the pigment grind a small amount of a non-ionic emulsifier or a non-ionic pigment wetting agent such as Capcure 65 (which would serve as both an emulsifier and a wetting agent). Since Capcure 65 may serve in the present composition as an epoxy emulsifier, it would do double duty in this fashion.

The following table illustrates paint formulas in accordance with the invention. A 100 gallon basis has been chosen merely for convenience so that volumes of Part A and B (50 gallons of Part A to 50 gallons of Part B) can be readily calculated. These volume formulas are also useful because the application from spray guns is done on a volume basis. The most convenient volume ratio for spray application is a ratio of Part A to Part B of about 1:1.

White Formula For Parts A and B
High solids, low $H_2O$ content, 48% pigment volume concentration ("PVC")

| | Pounds | Gallons | Solids Pounds | Solids Gallons |
|---|---|---|---|---|
| Part A | | | | |
| Glyoxal, 40% | 125 | 11.9 | 50 | 4.0 |
| $H_2O$ | 90 | 10.8 | — | — |
| non-ionic pigment wetting agent* | 27.5 | 3.0 | 17.9 | 1.88 |
| Titanium dioxide** | 125 | 3.68 | 125 | 3.68 |
| Silica extender pigment*** | 250 | 11.36 | 250 | 11.36 |
| | 250 | 11.36 | 250 | 11.36 |
| Emulsion liquid epoxy resin**** | 93 | 9.12 | 50 | 5.15 |
| | 710.5 | 49.9 | 492.9 | 26.07 |
| Part B | | | | |
| $H_2O$ | 75 | 9.0 | — | — |
| Amine curing agent as described in Example 7 below | 227 | 27.4 | 200 | 24.1 |
| Silica extender*** | 300 | 13.6 | 300 | 13.6 |
| | 602 | 50.0 | 500 | 37.7 |

*Such as Capcure 65, available from Diamond Shamrock
**Such as TiPure 902, available from DuPont
***Such as Minex 4, which is a silicate ground to a fine powder or Novacite 550, which is pure $SiO_2$ ground to a fine powder
****Emulsion of 95 parts liquid epoxy resin, 5 parts emulsifier solids such as Capcure 65, the above at 60% of non-volatile in water. (Alternatively, an 85% solids emulsion could be used.)

Yellow Formula For A and B
High solids, low $H_2O$ content, 49% PVC

| | Pounds | Gallons | Solids Pounds | Solids Gallons |
|---|---|---|---|---|
| Part A | | | | |
| Glyoxal, 40% | 117 | 11.1 | 46.8 | 3.75 |
| $H_2O$ | 48 | 5.7 | — | — |
| non-ionic pigment wetting agent* | 26 | 3.3 | 16.9 | 1.77 |
| Titanium dioxide** | 23 | 0.7 | 23 | 0.7 |
| water dispersion of a yellow azo pigment*** | 36 | 3.9 | 15 | 1.5 |
| water dispersed orange azo pigment**** | 60 | 6.1 | 33 | 3.3 |
| Silica extender***** | 234 | 10.6 | 234 | 10.6 |
| liquid epoxy resin emulsion****** | 78 | 8.5 | 46.8 | 4.8 |
| | 622 | 49.9 | 415.5 | 26.42 |
| Part B | | | | |
| $H_2O$ | 75 | 9.0 | — | — |
| Amine curing agent as described in Example 7 below | 227 | 27.4 | 200 | 24.1 |
| Silica extender***** | 300 | 13.6 | 300 | 13.6 |
| | 602 | 50.0 | 500 | 37.7 |

*Such as Capcure 65 available from Diamond Shamrock
**Such as TiPure R902, available from DuPont
***Such as Dalamar Yellow YW-911P, available from Heubach
****Such as Dalamar Yellow YW-822P, available from Heubach
*****Such as Minex 4
******Emulsion of 95 parts liquid epoxy resin, 5 parts emulsifier such as the above 60% in $H_2O$

4. Preparation of Urea-formaldehyde Ether Monomer

In a three liter glass flask fitted with a stainless steel paddle, stirrer, thermometer, a pH elecrode and a reflux condenser, the following materials were charged:

| 1152 gm. | methyl alcohol (99%) (36 moles) |
|---|---|
| 1187 gm. | 91% flake paraformaldehyde (corresponding to 36.0 moles of 100% $CH_2O$) |
| 540 gm. | urea (9 moles) |

The above mixture, which had an initial pH of about 3.0, was stirred and heated to 40° C. The pH was then adjusted to 10.5 by the addition of a small amount of 40% sodium hydroxide. As the temperature rose to 55° C., the paraformaldehyde and the urea dissolved in the methyl alcohol to give a clear solution. The solution was stirred for about one and a half hours while the temperature was maintained in the range of about 55°–60 C. and the pH was maintained at about 9–10 (by adding sodium hydroxide as necessary) to force the formation of tetramethylol urea.

At this point, a small amount of a 50% aqueous solution of sulfuric acid was added to bring the pH to about 2.5. This caused a mild exotherm, raising the solution temperature to about 78° C. The pH was maintained at 2.0–2.5, and the temperature was maintained at about 80° C. for about 40 minutes. Then the pH was brought to 7.0 with sodium hydroxide. The cooled urea-formaldehyde solution contained suspended $Na_2SO_4$, which was filtered out leaving a water-white, low-viscosity liquid containing about 60% of the non-volatile urea-formaldehyde ether monomer, N,N'-bis(methoxymethyl) uron in methyl alcohol and water.

5. Preparation Of A Polyaldehyde By Reacting A Conventional Urea Formaldehyde Resin With Glyoxal In a glass flask equipped with a paddle stirrer, thermometer, pH electrodes and reflux condenser were added:

555 gm. Water
533 gm. Urea (8.88 moles)
586 gm. 91% paraformaldehyde (533 gm. or 17.77 moles of formaldehyde)

The above mixture was heated to 50° C. and the pH was adjusted to about 10.5 with a small amount of aqueous sodium hydroxide. A mild exotherm took place, bringing the temperature to 60° C.

Next, 1330 gm. of 40% glyoxal (532 gm. or 9.17 moles of 100% glyoxal) in water were added to the mixture. The pH of the system dropped to about 5 due to the natural acidity of glyoxal (pH about 1–2). This acid pH allowed the glyoxal to react with the urea-formaldehyde to incorporate aldehyde groups.

The resulting resin had a non-volatile content of 60% in water. This resin reacted in about 5 seconds with the hexamethylene diamine urea-formaldehyde curing agent (as described in U.S. Pat. No. 4,490,510) to form a white solid.

6. Preparation of Amine Curing Agent from Hexamethylene Diamine and Urea Formaldehyde Ether Monomer as Taught in U.S. Pat. No. 4,490,510 (Part B)

Into a two liter flask equipped with a paddle stirrer, thermometer and distilling setup were placed 953 gm. of 70% solution of hexamethylene diamine in water. This amounted to 667 gm. (5.75 moles) of hexamethylene diamine calculated at 100% concentration.

The hexamethylene diamine was stirred at room temperature and 333 gm. (1.75 moles or 7 equivalents on a 100% solids basis) of N,N'-bis(methoxymethyl) uron (a type of urea formaldehyde resin used in textile treating; see U.S. Pat. No. 3,309,341 as well as Example 4 above for a method of manufacture) were added. The urea formaldehyde reacted with the hexamethylene diamine, causing a mild exotherm (raising the temperature from 20° C. to about 40° C.) and producing methanol and water as by-products. The methanol and a small amount of the water were removed by distilling up to a vapor temperature of 100° C. or slightly higher. The yield of solids in this reaction was 95% of the charged solids. The amount of remaining water in the resin was calculated (about 20% water and 80% solids) and additional water was added to bring the solids to 65%. This is a Part B component of the composition of the invention. It is a very low viscosity, colorless aqueous solution of the hexamethylene diamine/urea-formaldehyde monomer curing agent.

7. Preparation of Amine Curing Agent from Hexamethylene Diamine, A Long Chain Ether Diamine and Urea-formaldehyde Ether Monomer (Part B)

In this example a blend of hexamethylene diamine with polypropylene diamines of average molecular weight about 400 (Jeffamine D-400) in a ratio of about 2 parts hexamethylene diamine to 1 part polyoxypropylene diamine were used in Part B to produce films of increased flexibility.

The procedure parallels that of the previous example:

643 gm. 70% hexamethylene diamine (450 gm. or 3.88 moles of 100% hexamethylene diamine)

250 gm. Jeffamine D-400 (0.625 moles)

500 gm. N,N'-bis(methoxymethyl) uron as 60% solids in methanol (as 100%, 300 gm., 1.58 moles or 6.32 equivalents on the basis of 100% solids) (see Example 4).

Exotherm 21°-33° C.

Methanol was distilled off and the reaction product was adjusted to 65% solids in water. The resulting curing agent was a low viscosity, colorless, aqueous solution similar to that of Example 6.

8. Preparation of and Application of White Traffic Paint

A white traffic paint coating was prepared by combining Part A with Part B as set forth above in Example 3.

The coating was successfully applied to asphalt and concrete pavements with Binks "Formulator" double piston airless spraying units attached to Binks conventional airless spray guns. The standard formulator unit delivered two equal volume streams of liquid to a standard double-headed airless spray gun. The nozzles of the spray guns were about three inches apart and were aimed at a target several inches in front of them, where components A and B met to produce a coating in accordance with the present invention. Application was also undertaken with a Binks Model 43PA unit in which Parts A & B were mixed internally before application with a single airless spray gun.

Finally, 40 mil diameter glass beads were introduced using a conventional bead spray gun. About 75% of the surface area of the coating is covered with these 40 mil beads by spraying the beads onto the paint film from a bead gun positioned one to two inches behind the gun which applied the coating. The coating was found to produce a meniscus about the beads resulting in enhanced bead retention after an initial cure of about 30 seconds. These larger beads were found to produce enhanced visibility in wet weather since the larger beads protruded from the coating film considerably farther than the conventional small beads and in any event well beyond the depth of the water film present on the coating surface. In addition, the larger beads were found to reduce dirt transfer from automobile tires and to prevent paint pick-up from the coating during the initial curing stage.

9. Examination Of Polyamines To Determine Those Suitable For Part B

In this example, 10 grams of various polyamines were reacted with a like amount of glyoxal (40% in water) to determine which polyamines produced acceptable products in terms of appearance, viscosity, and severity of reaction exotherm. The results were as follows:

| Run | Polyamine | Appearance | Exotherm |
|---|---|---|---|
| 1. | diethylene triamine | very dark brown-black semi-solid | extremely vigorous |
| 2. | N—aminoelthyl piperzine | very dark brown-black semi-solid | very vigorous |
| 3. | 50% D-230 25% diethylene-triamine 25% urea form-aldehyde | very dark brown-black semi-solid | vigorous |
| 4. | 40% D-230 15% diethylene-triamine 45% urea form-aldehyde | very dark viscous liquid | vigorous |
| 5. | 67% hexamethylene diamine 33% urea form-aldehyde | light tan strong solid | low |
| 6. | 45% hexamethylene diamine 25% D 400 30% urea form-aldehyde | light tan strong solid | low |
| 7. | 70% hexamethylene diamine | light tan strong solid | low |
| 8. | isophrone diamine | light tan strong solid | low |
| 9. | 2-methyl pentamethylene diamine | light tan strong solid | low |
| 10. | meta xylene diamine | light tan strong solid | low |

Runs 5-10 above showed acceptable results, showing that the indicated polyamines could be used in Part B of the invention. The polyamines of runs 1-4 were unacceptable.

10. Preparation and Application of an Alternative White Traffic Paint

A white traffic paint coating which is particularly well suited to striping asphalt substrates was prepared as described above in Examples 3 and 8 from the following materials:

| White Formula For Parts A and B | | | | |
|---|---|---|---|---|
| | Pounds | Gallons | Solids Pounds | Solids Gallons |
| Part A | | | | |
| Glyoxal, 40% | 140 | 13.3 | 56 | 4.5 |
| H$_2$O | 32 | 3.8 | — | — |
| Non-ionic pigment wetting agent* | 10 | 1.1 | 6.5 | .6 |
| Titanium dioxide** | 150 | 4.4 | 150 | 4.4 |
| Silica extender pigment*** | 140 | 6.3 | 140 | 6.3 |
| Emulsion liquid epoxy resin**** | 66 | 7.0 | 56 | 5.8 |
| Acrylic latex***** | 125 | 14.0 | 75 | 7.5 |
| | 663 | 49.90 | 483.5 | 29.1 |
| Part B | | | | |
| H$_2$O | 48 | 5.8 | — | — |
| Trifunctional curing | 175 | 20.6 | 131 | 15.4 |

White Formula For Parts A and B (continued)

| | Pounds | Gallons | Solids Pounds | Solids Gallons |
|---|---|---|---|---|
| agent as described below (75% solids) | | | | |
| Acrylic latex (60% solids)***** | 140 | 15.7 | 84 | 9.0 |
| Silica extender*** | 171 | 7.9 | 171 | 7.9 |
| | 534 | 50.0 | 386 | 32.2 |

*Such as Capcure 65, available from Diamond Shamrock
**Such as TiPure 902, available from DuPont
***Such as Minex 4, which is a silicate ground to a fine powder or Novacite 550, which is pure SiO₂ ground to a fine powder
****Emulsion of 95 parts liquid epoxy resin, 5 parts emulsifier solids such as Capcure 65, the above at 85% of non-volatile in water
*****Such as UCAR LATEX 123, available from Union Carbide Emulsion Systems of Cary, North Carolina (solids content in weight percent 60%; pH 5.8).

The trifunctional curing agent was made up in a two liter flask equipped with a paddle stirrer, thermometer and distillation apparatus. The flask was charged with 2485 gm. of a 70% solution of a hexamethylenediamine in water. This amounted to 1740 gm. (15 moles) of hexamethylenediamine calculated at 100% concentration. Then 305 gm. (5 moles) of monoethanolamine were added and the mixture was stirred at room temperature while 1605 gm. of urea-formaldehyde (as 59.2% solids in methanol) were introduced. The urea-formaldehyde amounted to 950 gm. (5 moles or 20 equivalents), calculated at 100% solids concentration. The urea-formaldehyde reacted with the hexamethylenediamine, causing a mild exotherm (raising the temperature from 15° C. to 45° C.) and producing methanol and water as by-products. The methanol and a small amount of the water were removed by distilling up to a vapor temperature of about 100° C. to yield 3447 gm. of product, which comprised a 75% solids concentration.

A coating composition was prepared by combining Parts A and B in a 1:1 ratio. The composition was applied by spraying onto an asphalt substrate. The coating exhibited excellent adhesion and color. When glass beads were introduced, the composition also exhibited outstanding bead retention under heavy traffic conditions.

In order to enhance the whiteness of the coating, a small amount of a bluing compound could be added to Part A and/or Part B of the composition. For example, enhanced coating whiteness was obtained by adding to Part B of the above composition about 0.73 pounds per 50 gallons of a water-dispersed blue pigment known as AQUASPERSE DISPERSION 877-7504 (ultramarine blue) which is available from Nuodex, Inc. of Piscataway, New Jersey.

11. Preparation and Application of Another Alternative White Traffic Paint

Another white traffic paint coating which is particularly well suited to striping asphalt substrates can be prepared as described above in Examples 3 and 8 from a styrene-butadiene latex using the following materials:

White Formula For Parts A and B

| | Pounds | Gallons | Solids Pounds | Solids Gallons |
|---|---|---|---|---|
| Part A | | | | |
| Glyoxal, 40% | 140 | 13.3 | 56 | 4.5 |
| Non-ionic pigment wetting agent* | 10 | 1.1 | 6.5 | 0.6 |
| Titanium dioxide** | 90 | 2.63 | 90 | 2.63 |
| Silica extender pigment*** | 175 | 8.06 | 175 | 8.06 |
| Emulsion liquid epoxy resin**** | 66 | 7.0 | 56 | 5.8 |
| Styrene-butadiene latex***** | 156 | 18.42 | 75 | 8.66 |
| | 637 | 50.51 | 458.5 | 30.25 |
| Part B | | | | |
| Trifunctional curing agent as described in example 10 (75% solids) | 175 | 20.6 | 131 | 15.4 |
| Styrene-butadiene latex****** | 175 | 20.60 | 84 | 9.7 |
| Silica extender*** | 171 | 7.9 | 171 | 7.9 |
| | 521 | 49.16 | 386 | 33.0 |

*Such as Capcure 65, available from Diamord Shamrock
**Such as TiPure 960, available from DuPont
***Such as Minex 4, which is a silicate ground to a fine powder or Novacite 550, which is pure SiO₂ ground to a fine powder
****Emulsion of 95 parts liquid epoxy resin, 5 parts emulsifier solids such as Capcure 65, the above at 80% of non-volatile in water
*****Such as DOW RAP 213 solids content in weight percent 48%

A coating composition prepared by combining Parts A and B in a 1:1 ration and applied by spraying onto an asphalt substrate would exhibit excellent adhesion and color. If glass beads were introduced, the composition would also exhibit outstanding bead retention under heavy traffic conditions.

12. Preparation and Application of Asphalt Emulsion

An asphalt emulsion based coating was prepared and applied in accordance with the present invention as described below.

First, Part A was blended from the following components:

100 gm. Akzo cationic asphalt emulsion CSS-1 Zeta potential 22 millivolts, solids 61.6%
50 gm. glyoxal 40% (adjusted to pH 6 with NaHCO₃)
50 gm. 60% solids emulsion of liquid epoxy resin using Capcure 65 emulsifier (non-ionic)

Blending was accomplished merely by stirring the components together to produce a stable mixture which did not coagulate or form a skin on its surface.

About 30 gm. of the above mixture was combined with Part B which was comprised of 10 gm. of urea-formaldehyde (30%), hexamethylene diamine (30%) and Jeffamine D400(40%). The resulting product immediately turned solid and non-tacky, and a small amount of water squeezed out of the resulting solid lump.

Acceptable asphalt emulsion based coatings would be obtained if the epoxy of Part A above were deleted or if some or all of the epoxy were replaced with polyvinyl acetate latexes, vinyl acrylic latexes, acrylic latexes, styrene-acrylic latexes and styrene-butadiene latexes. In addition, if the cationic asphalt emulsion described above were replaced with a nonionic or an anionic asphalt emulsion, acceptable asphalt emulsion based coatings would also be obtained, both with epoxy resin, and/or with the indicated alternative coating materials.

If desired, Parts A and B above could be sprayed through a single or a double nozzle spray machine as described with respect to the asphalt-free compositions to lay down a rapid cure coating suitable for airport tarmacs and aprons, parking lots and even for paving thin layers on streets. The resulting coatings would resist gasoline, fuel oil and other organic solvents. In fact, sand and similar filling materials could be combined into the coatings and sprayed in place in the same manner as described above with respect to the glass beaded traffic paints, thus providing an asphalt/aggregate coating. Finally, as in the case of the asphalt free coatings, these various coatings could be applied under wet and cool weather conditions.

13. Preparation and Application of 100 Mil Thick Protective Coating To Inside Of Petroleum Storage Tanks Steel petroleum storage tanks require a lining to prevent the growth of microorganisms at the petroleum/water interface in the water that collects in the tanks due to condensation. The microorganisms are undesirable because they form a slime which can foul fuel oils, jet fuels, etc.

Conventional polyester coatings used in the past have had a number of drawbacks, including cracking due to rapid cure, the release of undesirable volatile styrene monomers and sagging on vertical and overhead surfaces due to the necessary thickness of these coatings in these applications.

A system for application to petroleum storage tanks was prepared in accordance with the present invention, as follows:
  (a) Part A
    12 parts by weight of 40% glyoxal
    50 parts by weight of an emulsion of conventional liquid epoxy resin (solids approximately 55%)
  (b) Part B (reacted as set forth in Example 7; diluted to 80% in water)
    25.4% hexamethylene diamine (0.219 moles)
    29% Jeffamine D-400 (0.073 moles)
    17.8% monoethanolamine (0.219 moles)
    27.7% urea-formaldehyde as N,N'-bis(methoxymethyl) uron (0.148 moles or 0.583 equivalents)

The above materials, shown as in their charge weights, were reacted as illustrated in Examples 6 and 7.

Parts A and B were applied to vertical metal surfaces using a single spray system with a Binks 43 PA type gun and the formulation described above, at 100 mils thickness. No significant sagging was observed and the resulting epoxy coating did not crack and was expected to be able to protect the sprayed surface from petroleum products for an extended period of time at least equal to that obtained with polyester coatings of like thicknesses.

14. Preparation and Application of 120 Mil Traffic Paint Coating

A system for application of 120 mil thick traffic stripes was prepared as follows:

| Part A (50 gallons) | |
|---|---|
| glyoxal | 113.08 lb. |
| H$_2$O | 136.31 lb. |
| Capcure 65 | 12.35 lb. |
| Epoxy emulsion (85% solids) | 72.22 lb. |
| Defoamer | 0.95 lb. |
| TiO$_2$ | 113.08 |
| Minex 4 | 226.16 |
| | 674.15 lb. (50 gallons) |

Part A was prepared as an 85% solids oil-in-water emulsion by combining the above components in a planetary mixer as described in U.S. Pat. No. 3,669,900 at Table 1, Example 5 (columns 5 and 6). The resulting oil-in-water emulsion resembled mayonnaise in consistency.

| Part B | |
|---|---|
| water | 71.75 lb. |
| curing agent (80% solids in water: 2 moles hexamethylenediamine 2 moles monoethanolamine 1 mole (4 equiv.) N,N'—bis(methoxymethyl) uron | 240.42 lb. |
| Minex 4 | 270.83 lb. |
| | 583.00 |

The above formulation was applied to an asphalt road surface with an applicator in which Parts A and B were mixed internally before application and sprayed onto the surface in a single 120 mil thick coating strip. The strip could withstand traffic almost immediately. It resisted curling and exhibited excellent toughness.

15. Preparation of Dual Cure Coatings Using Synthetic Acrylic Latex, Alkyd Emulsions and Epoxy Ester Emulsions The following alternative dual cure rate coatings were prepared in accordance with the invention in order to demonstrate coatings prepared with water-dispersible components other than epoxy resin emulsions.

I. Acrylic Latex
  Part B'
    1.5 moles 2-methylpentamethylene diamine
    0.5 mole Jeffamine D-400
    2.0 moles monoethanol amine
    1.0 mole (four equivalents) N,N'-bis(methoxymethyl) uron The above components were reacted in the same manner as shown in Examples 6 and 7 to form a "difunctional curing agent." Then 50 grams of 80% of the above difunctional curing agent in water were mixed with 50 gm. of Rhoplex MC-76 which is an acrylic latex for cementitous materials having a solids content (in weight percent) of 46% to 48% and a pH of 9.5 to 10.0, available from Rohm and Haas Company of Philadelphia, Pa. This mixture of acrylic latex and difunctional curing agent produced a semi-transparent, slightly viscous, yellowish liquid. Next, 35 gm. of glyoxal (in water) were added while stirring with a spatula and a film of the mix was immediately spread on a test panel.

The resulting film was transparent, glossy and yellowish, and became progressively harder and practically tack-free over the next 20 minutes. The bulk mix became a rubbery mass within about 30 seconds.

In another application, UCAR 503 (47% solids; available from Union Carbide) was successfully used in the following formulation:

| Part A | |
|---|---|
| Water | 75 lb |
| Glyoxal | 100 lb. |
| TiO$_2$ | 90 lb. |
| Minex 4 | 250 lb. |
| 62.5% Epoxy Emulsion | 64 lb. |
| UCAR 503 | 90 lb. |
| | 669 lb. (50 gal.) |

| Part B | |
|---|---|
| Water | 100 lb. |
| Difunctional Curing agent (prepared as in Example 7) | 200 lb. |
| CaCO$_3$ Pigment | 300 lb. |
| M-405 | 105 lb. |
| | 705 lb. (50 gal.) |

As with the Rhoplex MC-76, when the coating composition was applied to a steel test panel, the resulting film was transparent, glossy and yellowish, and became progressively harder and practically tack-free over the next 20 minutes. The bulk mix became a rubbery mass within about 30 seconds.

II. Alkyd

A 30 gm. sample of glyoxal (40% in water) was mixed with 50 gm. of an emulsion of 57% soy oil alkyd, at a level of about 60% solids in water. The emulsion had a particle size of 1.0 microns and contained 0.1% Co, 0.05% Mn, and 0.1% Ca as dryers. The resulting product was a low viscosity oil-in-water emulsion which, when combined with 50 gm. of Part B' above (curing agent in absence of the Rhoplex MC-76), produced a smooth, somewhat viscous mixture. When applied to a cardboard test chart, the film polymerized in about 20–30 minutes and bulk-hardened in about 30 seconds.

III. Epoxy Ester 30 gm. of a 40% glyoxal (in water) was combined with 50 gm. of an emulsion of an epoxy ester of tall oil fatty acids (50% epoxy resin and 50% tall oil fatty acids). The emulsion was about 60% solids and had a particle size of about 1.0 microns. The emulsion is available as a commercial product under the trademark CEE5, from Pacific Anchor Company of Los Angeles, Calif. 50 gm. of Part B' above was stirred into the mixture, to produce a smooth, somewhat viscous mixture. When the mixture was applied to a cardboard test chart, the film polymerized in about 20–30 minutes and bulk-hardened in about 30 seconds.

In summary, the above synthetic acrylic latex, alkyd and epoxy ester emulsion based coatings produced films that polymerized rapidly at room temperature, despite the absence of epoxy component, by way of the glyoxal/Part B' reactions. After drying, the additional water-dispersible resin (latex, alkyd and epoxy ester) gave hardness and toughness to the coatings.

While the present invention is described above in connection with preferred or illustrative embodiments, these embodiments are not intended to be exhaustive or limiting of the invention. Rather, the invention is intended to cover all alternatives, modifications and equivalents which may be included within its spirit and scope, as defined by the appended claims.

What is claimed is:

1. A water-based composition which, in a rapid cure stage will form an initial protective film and in a slower curing stage will of either of these which retain free aldehyde groups, and an aqueous component selected from the group consisting of (I) epoxy resin emulsions, (II) an aqueous component other than an epoxy resin emulsion and selected from the group consisting of synthetic latexes stable at about pH 7 or less, low molecular weight resin emulsions, epoxy ester emulsions, water emulsified alkyds and cationic-, anionic-, or nonionic asphalt emulsions, and (III) mixtures of (I) and (II); and
    said Part B component comprising the non-gel reaction product of a urea-formaldehyde ether monomer and a polyamine chosen from the group consisting of primary and secondary amines.

2. The water-based composition of claim 1, wherein the urea-formaldehyde ether monomer is N,N'-bis(methoxymethyl) uron.

3. The water-based composition of claim 1, wherein the urea-formaldehyde ether monomer includes methylol groups up to a level short of that which would produce a gel.

4. The water-based composition of claim 1 wherein the polyaldehyde is glyoxal.

5. The water-based composition of claim 1 wherein the polyaldehyde is glutaraldehyde.

6. The water-based composition of claim 1 wherein the polyaldehyde is the reaction product of glyoxal and a urea/formaldehyde resin.

7. The water-based composition of claim 1 wherein the aqueous component is an epoxy resin emulsion.

8. The water-based composition of claim 7 wherein the epoxy resin emulsion formed by emulsifying the condensation product of epichlorohydrin and bisphenol A.

9. The water-based composition of claim 8 wherein the epichlorohydrin and bisphenol A condensation product has a weight per epoxy of about 190.

10. The water-based composition of claim 1 wherein the synthetic latex is a polyvinyl acetate latex.

11. The water-based composition of claim 1 wherein the synthetic latex is a vinyl acrylic latex.

12. The water-based composition of claim 1 wherein the synthetic latex is an acrylic latex.

13. The water-based composition of claim 1 wherein the synthetic latex is a styrene-acrylic latex.

14. The water-based composition of claim 1 wherein the synthetic latex is a styrene-butadiene latex.

15. The water-based composition of claim 11 wherein the vinyl acrylic latex is a copolymer containing about 10–15% by weight acrylic monomer and about 85–90% vinyl acetate monomer.

16. The water-based composition of claim 1 wherein the polyamine is a primary amine.

17. The water-based composition of claim 16 wherein the primary amine is hexamethylene diamine.

18. The water-based composition of claim 16 wherein the primary amine is polyoxypropylene diamine.

19. The water-based composition of claim 1 wherein the polyamine of Part B is blended with a monoamine in a mole ratio of polyamine to monoamine of about 1:0 to 1:3.

20. The water-based composition of claim 19 wherein the monoamine is monoethanolamine.

21. The water-based composition of claim 1 wherein Part B comprises the reaction product of two moles hexamethylene diamine, two moles monoethanolamine and one mole N,N'-bis(methoxymethyl) uron.

22. The water-based composition of claim 1 wherein Part B comprises the reaction product of three moles hexamethylene diamine, one mole monoethanolamine and one mole N,N'-bis(methoxymethyl) uron.

23. The water-based composition of claim 2 wherein the polyamines and the N,N'-bis(methoxymethyl) uron are present in a mole ratio of about 2:3 to 5:1.

24. The water-based composition of claim 1 wherein the polyamine is a hexamethylene diamine isomer.

25. The water-based composition of claim 1 wherein the aqueous component is an asphalt emulsion.

26. The water-based composition of claim 1 wherein the polyamine is a combination of polyoxypropylene diamine and hexamethylene diamine, the polyoxypropylene diamine has a molecular weight of about 230 to 400, and the mole ratio of the hexamethylene diamine to the polyoxypropylene diamine is from about 4:1 to 1:4.

27. The water-based composition of claim 1 in which pigments are introduced into the composition at a level of about 30 to 55 pigment volume concentration by blending the pigments into Part A and/or Part B of the composition.

28. The water-based composition of claim 1 in which glass beads are introduced into the composition at a level of about 3 to 15 pounds per gallon of the composition.

29. The water-based composition of claim 1 wherein a synthetic latex stable at a pH of at least about 11 is introduced into Part B of the composition.

* * * * *